United States Patent
Bleiholder et al.

(10) Patent No.: US 11,240,371 B2
(45) Date of Patent: Feb. 1, 2022

(54) METHOD FOR DETERMINING VOICE QUALITY IN A TELECOMMUNICATIONS NETWORK

(71) Applicant: HEAD acoustics GmbH, Herzogenrath-Kohlscheid (DE)

(72) Inventors: Stefan Bleiholder, Wuerselen (DE); Frank Kettler, Aachen (DE); Silvia Poschen, Monschau (DE); Nils Rohrer, Aachen (DE)

(73) Assignee: HEAD acoustics GmbH, Herzogenrath-Kohlscheid (DE)

( * ) Notice: Subject to any disclaimer, the term of this patent is extended or adjusted under 35 U.S.C. 154(b) by 0 days.

(21) Appl. No.: 16/914,222

(22) Filed: Jun. 26, 2020

(65) Prior Publication Data

US 2020/0412866 A1  Dec. 31, 2020

(30) Foreign Application Priority Data

Jun. 26, 2019 (DE) .......................... 102019117249.7

(51) Int. Cl.
*H04M 3/22*  (2006.01)
*H04L 29/06*  (2006.01)

(52) U.S. Cl.
CPC .......... *H04M 3/2236* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 6,370,120 B1* | 4/2002 | Hardy | H04L 29/06027 370/235 |
| 7,664,231 B2* | 2/2010 | Schmidmer | H04M 3/2236 379/1.02 |
| 2002/0114296 A1* | 8/2002 | Hardy | H04M 3/2236 370/332 |
| 2005/0163047 A1* | 7/2005 | McGregor | H04B 17/24 370/229 |
| 2006/0153174 A1* | 7/2006 | Towns-von Stauber | H04L 65/80 370/356 |
| 2007/0253337 A1* | 11/2007 | Morinaga | H04L 47/34 370/249 |

* cited by examiner

*Primary Examiner* — Quoc D Tran
(74) *Attorney, Agent, or Firm* — Von Rohrscheidt Patents

(57) ABSTRACT

A method for determining a quality of voice transmitted by electrical signals between a first telecommunication terminal and a second telecommunication terminal in a telecommunication network, the method comprising: identifying a model type for the first telecommunication terminal and the second telecommunication terminal respectively; identifying at least one operating parameter for the telecommunication network; selecting at least one call aspect (i) of the transmitted voice wherein a quality of the transmitted voice shall be determined for the at least one call aspect; identifying a value of at least one quality parameter ($KQI_{A/B, i, n}$) for the at least one call aspect (i) for at least one of the first telecommunication terminal and the second telecommunication terminal as a function of a value of at least one selected engineering parameter ($KPI_{A/B}$) of the at least one telecommunication terminal as well as a function of the at least one operating parameter.

18 Claims, 2 Drawing Sheets

METHOD FOR DETERMINING VOICE QUALITY IN A TELECOMMUNICATIONS NETWORK

RELATED APPLICATIONS

This application claims priority from and incorporates by reference German patent application DE 10 2019 117 249.7 filed on Jun. 26, 2019 which is incorporated in its entirety by this reference.

FIELD OF THE INVENTION

The invention relates to a method for determining quality of voice that is transmitted by electrical signals by two telecommunication terminals through a telecommunication network.

BACKGROUND OF THE INVENTION

Voice transmission by modern telecommunication terminals like e.g. mobile phones, hands free devices and so called voice over IP devices is often subject to interference that is caused on the one hand side by the transmitting telecommunication network and on the other hand side by the quality of the telecommunication terminals involved. In order to assess audio quality of the voice transmission typically call test are performed where the test persons respectively issue independent assessments regarding perceived quality of voice transmissions. Since these call tests are very complicated instrument methods have been developed that enable a prediction of quality of voice transmission in individual portions.

Thus the ITU-T recommendation G. 107 (06/15) describes a standardized method, the so called E-model for network planning wherein the assessment of the quality is characterized by a so called transmission factor (R-factor). The quality of the voice transmission is determined as a function of various transmission influences. The transmission influences thus determined are computed into a transmission scale in a first step. In a second step the individual values are subtracted from a maximum achievable signal to noise ratio. The result of this computation is a transmission factor that is influenced on the one hand side by the network influences and on the other hand side by the telecommunication terminals.

On a down side the known method is configured as a planning model which does not consider the influence of real modern terminals at all or that considers this influence only in a very basic manner.

BRIEF SUMMARY OF THE INVENTION

Thus, it is an object of the invention to develop an alternative method which provides improved precision.

The object is achieved by a method with the features of claim 1. Advantageous embodiments can be derived from the dependent claims 2-15. The method according to the invention includes the steps:

identifying at least one model type for each of the two telecommunication terminals respectively;
identifying at least one operating parameter for the telecommunication network,
selecting at least one call aspect of the transmitted voice wherein the quality of the call aspect shall be determined;
identifying a value of at least one quality parameter for the selected call aspect for at least one of the telecommunication terminals as a function of a value of at least one engineering parameter of at least one of the telecommunication terminals as well as a function of the operating parameter of the telecommunication network;
determining a value of an end to end quality parameter of the telecommunication terminal for the respective call aspect as a function of the identified value of the quality parameter, wherein the value of the end to end quality parameter of the first telecommunication terminal represents the quality of the voice transmission for the call aspect as perceived by a user of the first telecommunication terminal.

Model type according to the instant invention is an embodiment of at least one telecommunication terminal, typically of a plurality of telecommunication terminals combined under a model type. The telecommunication terminals combined under a model type are characterized in particular in that acoustic components of the telecommunication terminals influence quality of voice transmission in a similar or identical manner. Acoustic components according to the instant invention are physical components, in particular speakers and microphones and software components, in particular voice processing algorithms like e.g. echo compensation interference noise reduction automatic attenuation control and jitter buffers. By the same token a voice processor that is configured to manipulate a voice signal and that has the same model type can be similar. Thus, a model type can include in particular also different models of a particular telecommunication terminal or telecommunication terminals of different manufacturers.

A call aspect according to the instant invention is an aspect of a call wherein a perceived quality of the aspect is configured to influence an overall call quality of the voice transmission. The quality of a voice transmission between two users of a respective telecommunication terminal is assessed by the user of the first telecommunication terminal based on a form in which voice is transmitted that is put out by the user of the second telecommunication terminal. The assessment is thus performed on the one hand side based on how voice that is put out by the user of the second telecommunication terminal was transmitted to the user of the first telecommunication terminal, thus how the user of the second telecommunication terminal perceives the voice transmission. Thus, it is possible that an interference has the effect that voice put out by the second communication partner cannot be understood by the first communication partner due to word components that have not been transmitted. On the other hand side the assessment is performed based on how the user of the second telecommunication terminal perceives the transmission of the voice that is put out by himself. Thus, an echo can occur during voice transmission wherein the echo is perceived as annoying by the user of the second telecommunication terminal. Thus, the instant invention considers in particular the call aspects "listening quality objective", "echo", "double talk" and "listening effort" when determining overall call quality. However, it is also conceivable to use additional call aspects when assessing overall call quality.

An engineering parameter according to the instant invention is a value of a so called key performance indicator (KPI). The engineering parameters describe transmission and/or reception characteristics of individual acoustic components, in particular of the speaker and of the microphone of the telecommunication terminal in an objective manner, this means without assessment with respect to quality of the voice signal to be transmitted. Thus the values of the engineering parameters are influenced by different operating settings of the telecommunication terminal, e.g. of modes in which the telecommunication terminals are operated or of voice transmission algorithms like e.g. echo compensation or interference noise reduction. The invention uses in particular the engineering parameters "sending loudness rating", (SLR), "receiving loudness rating" (RLR) and "round trip delay" for describing the transmission and/or receiving characteristics of the individual acoustic components. However, it is also conceivable to select other engineering parameters that are known in the field of telecommunications. The measuring methods that are to be used for determining the engineering parameters are known in the art.

An "operating parameter" of the telecommunication network according to the instant invention is a variable that characterizes a transmission of data packets in a telecommunication network. According to the method according to the invention operating parameters that describe quality of the voice to be transmitted, in particular network run time, packet loss and jitter are particularly significant. The preceding operating parameters are influenced by various conditions. Thus, e.g. a number of routers between the telecommunication terminals has a significant impact upon network run time.

The value of a quality parameter according to the instant invention is a value of a so called "key quality indicator" (KQI). The quality parameter describes the quality of the transmitted voice with respect to a predetermined call aspect as perceived by a user of a telecommunication terminal. The values of the quality parameters were determined in lab tests under various conditions with respect to the participating telecommunication terminals and the conditions of the telecommunication network and are known for essentially all telecommunication terminals. The result of these test series is a multi-dimensional matrix that determines quality of the transmitted voice with respect to a particular call aspect as a function of a plurality of variable parameters. Measuring methods that are to be used for determining the quality parameters are known in the art.

A so called MOS value is typically used in the field of telecommunications for assessing a quality of voice transmission. A MOS value according to the instant invention is a value of the so called mean opinion score that forms an arithmetic mean of individual assessments as that is typically in a range from 1 (worst value) to 5 (best value). The MOS value is a result of a predetermined execution of plural auditive tests where a subjectively perceived quality of voice is assessed by a group of test persons. The determination of the quality of the voice, however, can also be computed by suitable methods. The result of the test series is graded in a 5 step quality scale.

The method according to the invention has many advantages. In particular the method allows to predict a quality of voice transmission from a view point of a user of a telecommunication terminal considering the participating telecommunication terminals, the interaction between the telecommunication network and the telecommunication terminal and the interaction between two telecommunication terminals in a connection. In known forecasting prediction models like the E-model, an influence of the telecommunication terminals was only considered in the computation of the quality of voice transmission by presuming standard parameters. In particular the non-linear behaviour of the telecommunication terminals caused by contemporary signal processing like interference noise reduction acoustic echo compensation or algorithms for reducing listening effort are not considered. Accordingly the E-model is not suitable for monitoring voice quality in view of actual modern terminals.

Furthermore the method according to the invention is configured to evaluate acceptance thresholds for technical parameters of the acoustic components of one or both telecommunication terminals when values of operating parameters of the telecommunication network are predetermined. The quality of voice transmission is determined on the one hand side by a condition of the telecommunication network and on the other side by the quality of the acoustic components of the participating telecommunication terminals. It has been found that the acoustic components of one or both telecommunication terminals have to comply with particular prerequisites as a function of a condition of the telecommunication network when an interference is caused by the telecommunication network in order to assure a pre-determined quality of a voice transmission. Thus, e.g. when a particular requirement is placed upon the quality of voice transmission the method according to the invention can be used to determine values of engineering parameters when current values of operating parameters of the telecommunication network are predetermined wherein the engineering parameters define a lower acceptance threshold, thus a minimum requirement for the acoustic components of the participating telecommunication terminals. By the same token the method according to the invention facilitates an evaluation of acceptance thresholds with respect to the operating parameters of the telecommunication network when engineering parameters of the telecommunication terminals are predetermined. Thus, a minimum requirement with respect to a condition of the telecommunication network can be determined as a function of the quality of the acoustic components of the participating telecommunication terminals.

It is furthermore advantageous that a determination of the quality of the voice transmission can be performed by the method according to the invention even when the technical parameters for one of the two participating telecommunication terminals are not known. In this case the technical parameters for the unknown telecommunication terminal can be presumed according to current standards.

The method according to the invention is suitable for monitoring the quality of a voice transmission in voice over IP based telecommunication networks on a call by call basis. Advantageously the method according to the invention is useable for narrow band and wider band telephone communications. It is also conceivable to use the method for super wide band for full band telephone communications.

Furthermore the method according to the invention can be used to determine a cause of interference with voice transmission. Typically a condition of the telecommunication network does not have any flaws. However, quality perceived by a user of a telecommunication terminal can be significantly impaired and often leads to a complaint of the affected user with an operator of the telecommunication network. The cause, however, often does not lie in the telecommunication network but in the quality of the acoustic components of the telecommunication terminals. Advantageously the operator of the telecommunication network can identify the interference in the voice transmission by using the method according to the invention and can refer to the acoustic components causing the interference when the user places his complaint.

It a particularly advantageous method according to the invention a respective value of at least one end to end quality parameter is determined for both telecommunication terminals. It has become apparent that the quality of a voice transmission is perceived differently by users of participating telecommunication terminals. The reason is that the acoustic components of different telecommunication terminals can lead to different interferences of voice transmission in transmission and reception direction. Thus, it is conceivable that the user of a first telecommunication terminal perceives an echo in the voice transmission as a nuisance whereas the user of a second telecommunication terminal does not hear any echo but perceives an interference with respect to the hearing situation. Thus, it is appreciated that determining a respective value of an end to end quality parameter is particularly advantageous for both telecommunication terminals. In particular when evaluating acceptance thresholds for technical parameters of the acoustic components of one or both telecommunication terminals assessing quality in view of both telecommunication terminals is particularly helpful.

In another embodiment of the method according to the invention the end to end quality parameter is determined by selecting the identified value for the quality parameter so that the end to end quality parameter corresponds to the quality parameter. Advantageously the end to end quality parameter is determined in a particularly simple manner. In particular no additional computation steps are required. The determination of the end to end quality parameter by selection is advantageously suitable for the call aspects "echo", "double talk" and "listening effort". Thus, it is conceivable to identify a quality parameter for the call aspect "echo" that was previously determined based on the identified operating parameters of the telecommunication network and the identified engineering parameters of the two telecommunication terminals. Since the end to end quality of the voice transmission for this call aspect can be described using only one quality parameter a separate computation can be omitted for determining the end to end quality parameter. Furthermore determining the end to end quality parameter is performed simply by using the identified quality parameter.

An advantageous embodiment of the invention provides that a respective value for the at least one quality parameter is identified for at least one call aspect for both telecommunication terminals. Thus, it is provided according an advantageous embodiment of the invention that determining the value of the end to end quality parameter is performed by selecting the value of one of the quality parameters of one of the two telecommunication terminals that represents a lower quality of the voice transmission for the respective call aspect as perceived by the user of the first telecommunication terminal. When looking at two different values for the end to end quality parameter selecting the quality parameter that represents an inferior quality of the voice transmission is useful since the quality of the voice transmission can thus be assessed more precisely. Furthermore evaluated acceptance thresholds for engineering parameters of the acoustic components of one of the two telecommunication terminals can be set higher. This selection is advantageously used when determining the end to end quality parameter for the call aspect "listening quality objective". A selection of this type is thus desirable since a respective value of a quality parameter of both telecommunication terminals has to be considered at least for the call aspect, "listening quality objective". For example the "listening quality objective" of a bad speaker of the first telecommunication terminal or of a bad microphone of the second telecommunication terminal can be determined. In both cases the user of the first telecommunication terminal would assess the listening quality object as overall negative. By the same token it is conceivable to compute different quality parameters of both telecommunication terminals with each other when assessing other call aspects.

It is also conceivable that a value of the quality parameters that represents an inferior quality of the voice transmission is downgraded by a factor. Thus, the factor represents the deviation of the value of the quality parameter that predicts a better quality of the voice transmission from an ideal value. It is conceivable for example that an MOS value of 4 is determined for the call aspect "listening quality objective" for the first telecommunication terminal in one transmission direction when determining the end to end quality parameter. On the other hand side an MOS value of 3 is determined for the second telecommunication terminal in a receiving direction. Computing other quality parameters with each other can thus be performed so that the value that represents an inferior quality of the voice transmission thus the value of the quality parameter in receiving direction is multiplied with a factor. Thus, the factor is computed from the deviation of the determined value of the quality parameter that predicts a better quality of the voice transmission (thus the value of the quality parameter in transmission direction from the maximum achieve able MLS value 5. The value of the quality parameter described supra deviates by one value point from the maximum achievable MOS value 5, thus corresponds to 80% of the maximum achievable value. Thus, the value of the end to end quality parameter can be computed with an MOS value of 0.8×3=2.4.

An advantageous embodiment of the invention provides that the identification of the value of the at least one quality parameter is performed respectively as a function of a value of a plurality of engineering parameters wherein at least one respective engineering parameter is advantageously associated with both telecommunication terminals.

The values of the quality parameters of the individual telecommunication terminals were determined in a lab tests as a function of variable values of different engineering parameters which are determined by the acoustic components of the telecommunication terminals themselves. Thus, it is e.g. conceivable that a quality parameter of a telecommunication terminal, namely the sound influence was determined for the call aspect "listening quality objective" as a function of variable values of an engineering parameter, namely the transmission characteristics of the microphone in preceding lab tests. An identification of the value of the quality parameter which designates the quality of the preceding call situation is performed in consideration of the values of the engineering parameters of the telecommunication terminals involved. Thus, a quality parameter is selected in the preceding embodiment in view of the consideration of the acoustic components of the participating telecommunication terminal wherein the quality parameter was determined at least under similar conditions, thus with a telecommunication terminal which transmits voice at least in a similar manner with respect to transmission characteristics of the telecommunication terminal. In case the values of the engineering parameters of the participating telecommunication terminals are not covered by lab tests the determination of the quality parameters can be advantageously performed by approximation or interpolation.

According to an advantageous embodiment it is provided that a respective value of an end to end quality parameter is determined for plural call aspects. Configuring the method according to the invention in more detail a value of a total call quality is determined for one of the two telecommunication terminals based on the plurality of values for the end to end quality parameters, wherein the determination is advantageously performed by weighted addition of the individual values of the end to end quality parameters for the individual call aspects. Thus, the overall call quality of the voice transmission can be performed e.g. in view of the call aspects "listening quality objective" "echo", "double talk", listening effort". A respective end to end parameter is determined for each of these call aspects. In order to determine total call quality the individual end to end quality parameters are weighted and added, thus it is conceivable for example that the individual weighting factors correspond to a value of 0.25 in the illustrated embodiment. In case that the values of the end to end quality parameters were determined as MOS value this weighting is particularly advantageous since it assures that the value of the total call quality is in a range of 1 to 5 and thus forms an MOS value as well. However, it is also conceivable to include additional call aspects when determining total call quality and to adapt the weighting factors accordingly. In any case a single value for the quality of the entire voice transmission is determined in consideration of all call aspects by determining total call quality.

According to an advantageous embodiment of the invention it is provided that weighting factors that weight the values of the different end to end quality parameters in the course of the addition are different for different call aspects.

It is appreciated that an echo that occurs during voice transmission impacts the user less than an imprecise voice transmission which causes the user of the second telecommunication terminal not to be understood. Sensing an echo would cause the quality of the voice transmission to be perceived as bad overall, the telephone call however will be completed as planned. However, a particularly low listening quality objective may cause the user to terminate the call and attempt a new call. With respect to the quality of voice transmission perceived by a user of a telecommunication terminal a disparity of the weighting factors is particularly advantageous in that the different call aspects are considered with different weighting with respect to an overall call quality by the user of the telecommunication terminal. Thus, it is conceivable that a weighting factor associated with the end to end quality parameter of the call aspect listening quality objective is minus 0.5 in the illustrated embodiment whereas the weighting factor associated with the end to end quality parameter "echo" is 0.1.

An advantageous embodiment of the invention provides at least one weighting factor, advantageously all weighting factors depend from the value of the associated end to end quality parameter wherein advantageously a context between a respectively weighting factor and the value of the associated end to end quality parameter is non-linear.

It has become apparent that a user of a telecommunication terminal perceives an interference of the voice transmission with respect to listening quality objective with a particular intensity where the call can be carried on only with great difficulty or not at all as more annoying than an echo with the same intensity. Thus, it is understood that an influence of the end to end quality of the voice transmission of each call aspect has to be considered with different weighting when determining a value of an overall call quality. It is conceivable for example that a weighting factor that is associated with the call aspect "listening quality objective" is minus 4.0 if the value of the end to end quality parameter was identified as MOS value 1. However, a weighting factor associated with the call aspect "echo" is only 3.4 for an identical value of the end to end quality parameter. In case that the result of the weighted addition of the individual values of the end to end quality parameters is mathematically negative it is advantageously provided to limit the value of the overall call quality in downward direction to an MOS value of 1 since this value typically represents a lower end of the MOS scale.

Typically the values of the quality parameters, the end to end quality parameter and of the overall call quality are specified as MOS values. Advantageously a quick and simple assessment of the quality of the voice transmission can thus be formed.

BRIEF DESCRIPTION OF THE DRAWINGS

The method according to the invention is subsequently described based on an embodiment with reference to drawing figures, wherein.

DETAILED DESCRIPTION OF THE INVENTION

Figure 1:
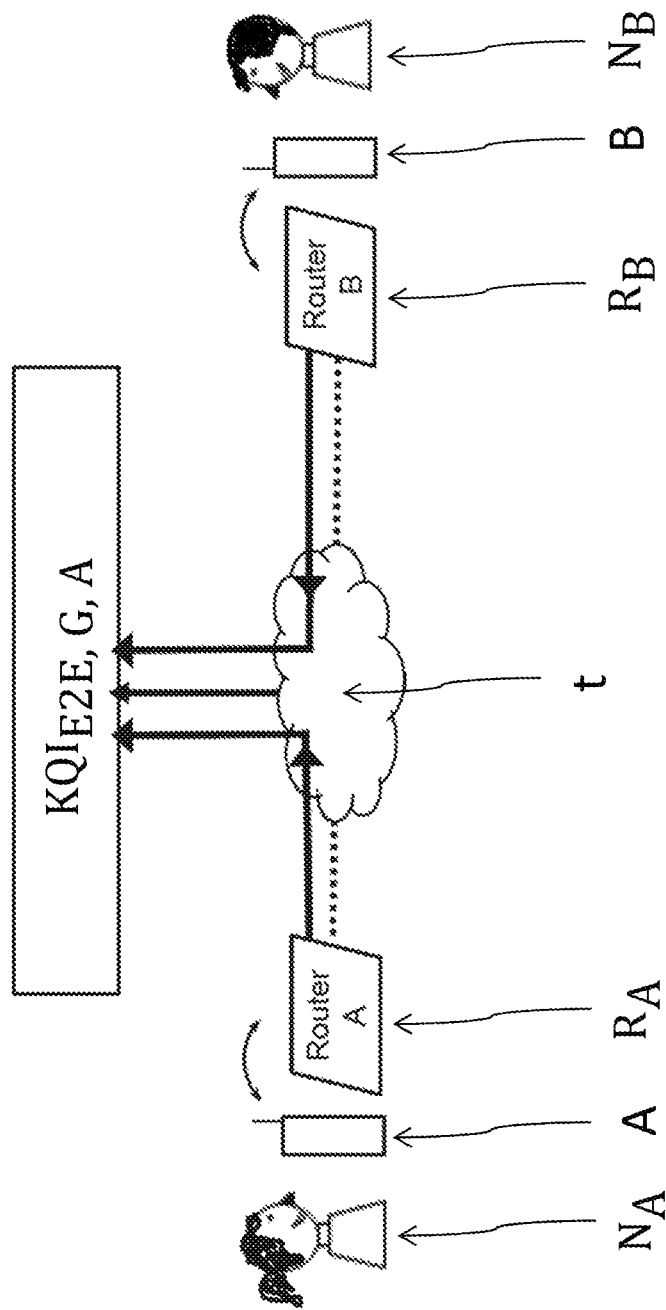
FIG. 1 illustrates a schematic of a call carried out on a telecommunication network.

FIG. 1 schematically illustrates a call carried out in a telecommunication network t. A user $N_A$ of the first telecommunication terminal A and a user $N_B$ of a second telecommunication terminal B are participants in a call. FIG. 1 also shows a first router $R_A$ a second router $R_B$ and the telecommunication network t. The transmission of the voice exchanged between the two users $N_A$, $N_B$ is performed by voice over internet protocol (VoIP).

The voice put out by the user $N_A$ is received by a microphone of the first telecommunication terminal A not illustrated in detail in FIG. 1 and converted into an electrical signal. The electrical signal is digitized and transmitted by the first router $R_A$ in data packets through the internet protocol (IP) to the telecommunication network t. Analogously the voice put out by the user $N_B$ is transmitted by the second router $R_B$ to the telecommunication network t. The voice signals transmitted as data packets are exchanged in the telecommunication network t so that the voice put out by the user $N_A$ is transmitted by the telecommunication network t through the second router $R_B$ by a speaker of the telecommunication terminal B that is not illustrated in detail to FIG. 1 to the user $N_B$, and in the same manner from the user $N_B$ to the user $N_A$.

Figure 2:
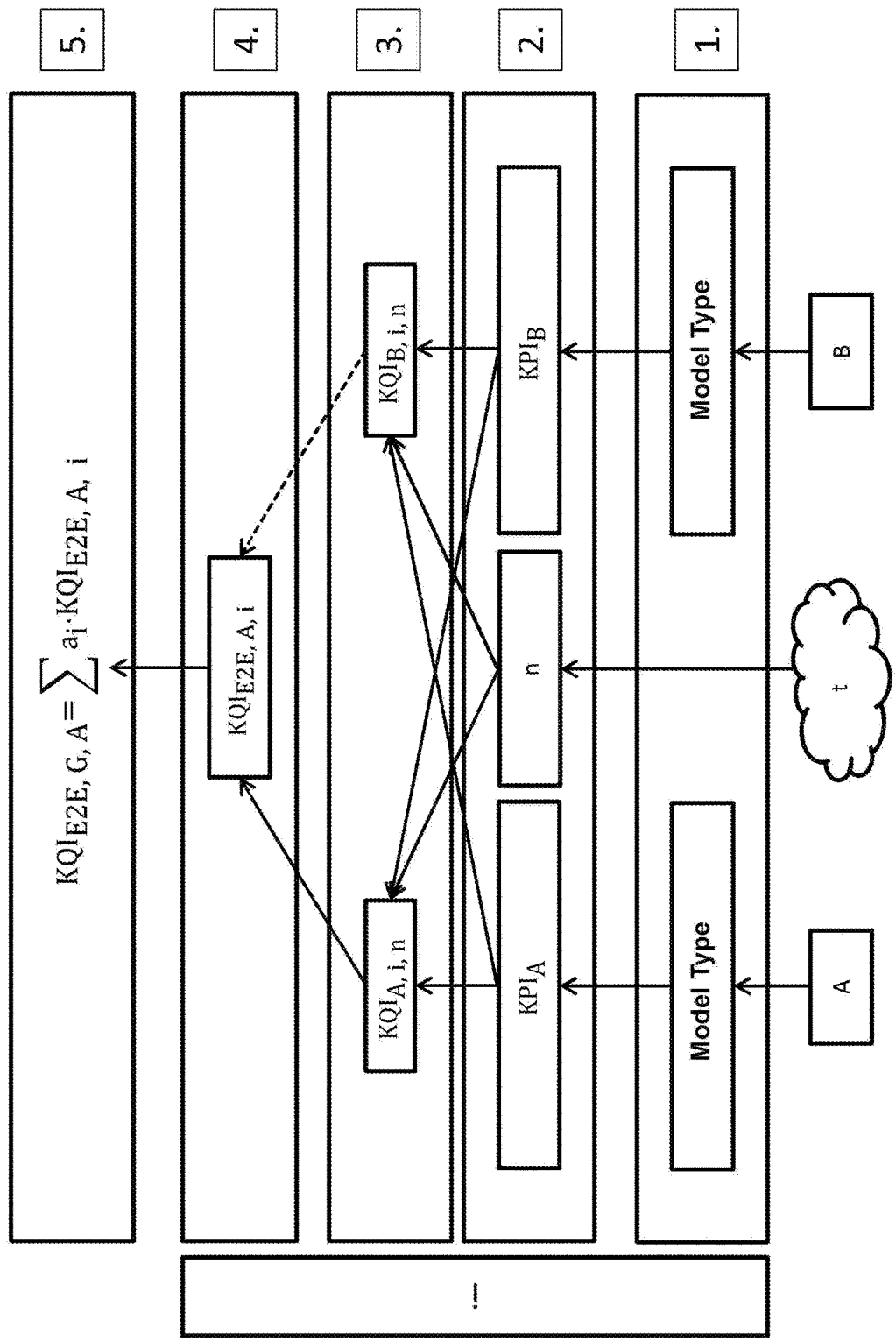
FIG. 2 illustrates a flow chart of the method according to the invention for determining a total call quality of the call.

Determining a total call quality $KQI_{E2E, G, A}$ of the voice transmission perceived by the user $N_A$ of the telecommunication terminal A is performed by the method according to the invention. FIG. 2 illustrates a flow chart of the method steps. Determining the total call quality $KQIE2E, G, A$ is performed by weighted addition of individual end-to-end quality parameters $KQI_{E2E, A, i}$, which were determined for different call aspects.

In a first step of the method according to the invention a model type of the respectively participating telecommunication terminals A, B is identified. Based on the identified model types values of engineering parameters $KPI_{A/B}$ of the two telecommunication terminals A, B, are interrogated in a second step wherein the values are required for a selected calls aspect i to identify a corresponding quality parameter $KQI_{A/B, i, n}$. Interrogating the engineering parameters $KPI_{A/B}$ is performed through the telecommunication terminals A, B, where the values of the engineering parameters $KPI_{A/B}$ of the respective telecommunication terminal A, B are stored. However, it is also conceivable that the engineering parameters $KPI_{A/B}$ are identified from a central data base. In this case the selection of a call aspect i predetermines which of the engineering parameters $KPI_{A/B}$ of the participating telecommunication terminals A, B, are interrogated.

Additionally at least one operating parameter n of the telecommunication network t is identified, thus values of the operating parameter n of the telecommunication network t are interrogated that are required for the selected call aspect i to identify a corresponding quality parameter $KQI_{A/B, i, n}$. In the illustrated embodiment current values of network run time, packet loss and jitter are identified as operating parameters n. It is also conceivable that additional operating parameter n are used to determine the overall call quality $KQI_{E2E, G, A}$ of the voice transmission.

Based on the identified engineering parameters $KPI_{A/B}$ and the identified operating parameters n of the telecommunication network t a third step identifies values of the quality parameters $KQI_{A/B, i, n}$ to identify the quality of the voice transmission with respect to the respective call aspects i. Thus, values of the quality parameters $KQI_{A/B, i, n}$ are selected which were determined in preceding lab tests under at least similar or identical conditions, this means using at least identical model types of the telecommunication terminals A, B and at least similar operating parameters n of the telecommunication network t. Selecting the values of the quality parameter $KQI_{A/B, i, n}$ can be performed in particular from a multi-dimensional matrix in which a plurality of values for the different combinations of engineering parameters $KPI_{A/B}$ and operating parameters n for the different call aspects i is stored.

From the identified quality parameters $KQI_{A/B, i, n}$ an end to end quality parameter $KQI_{E2E, A, i}$ is determined in a fourth step. Thus, the first four method steps are performed for a plurality of call aspects I, in particular for "listening quality objective", "echo", and "double talk" and "listening effort". Eventually a total call quality $KQI_{E2E, G, A}$ of the voice transmission is determined from the entirety of the end to end quality parameters $KQI_{E2E, A, i}$, wherein the total call quality is computed by weighted addition of the individual end to end quality parameters $KQI_{E2E, A, i}$. When determining the total call quality $KQI_{E2E, G, A}$ four call aspects i are considered infra.

In a first step the model types of the two telecommunication terminals A, B were identified.

In order to assess the voice received by the user A with respect to the call aspect i "listening quality objective" LQO the transmission sensitivity of the second telecommunication terminal B represented by the engineering parameter $KPI_B$ "sending loudness rating" SLR and the volume setting at the first telecommunication terminal A provided by the engineering parameter $KPI_A$ "receive loudness rating" RLR are used as engineering parameters $KPI_{A/B}$ for identifying a first quality parameter $KQI_{A, i=LQO, n}$. Additionally the current values of the packet loss and of the jitter of the telecommunication network t are identified. The value of a first quality parameter $KQI_{A, i=LQO, n}$ is identified as a MOS value of 4 based on the previously identified engineering parameters $KPI_{A/B}$ of the two telecommunication terminals A,B and the identified operating parameters n of the telecommunication network t.

Furthermore an additional quality parameter $KQI_{B, i=LQO, n}$ namely the sound influence of the second telecommunication terminal B is used for the call aspect i "listening quality objective when identifying the end to end quality parameter $KQI_{E2E, A, i=LQO}$. The sound influence describes what the transmission device of the second telecommunication terminal B sound like. Thus, the transmission characteristics of the microphone of the second telecommunication terminal B determines this sound. The value of the quality parameter $KQI_{B, i=LQO, n}$ is identified as a MOS value of 3.

Determining the end to end quality parameter $KQI_{E2E, A, i=LQO}$ is performed in the illustrated embodiment by selecting the value of the two quality parameter $KQI_{A/B, i=LQO, n}$ that predicts inferior quality of voice transmission. Therefore the following applies: $KQI_{E2E, A, i=LQO} = \min\{KQI_{A, i=LQO, n}, KQI_{B, i=LQO, n}\}$. From the comparison of the preceding quality parameters $KQI_{A/B, i=LQO, n}$ therefore the quality parameter $KQI_{B, i=LQO, n}$ that describes the sound influence of the second telecommunication terminal B is used for determining the end to end quality parameter $KQI_{E2E, A, i=LQO}$. The result of the end to end quality parameter $KQI_{E2E, A, i=LQO}$ is therefore a MOS value of 3.

An echo that is perceived by the user $N_A$ of the first telecommunication terminal A is caused by the second telecommunication terminal B. For the call aspect i "echo" E with reference to the user $N_A$ of the first telecommunication terminal A the transmission sensitivity of the first telecommunication terminal A represented by the engineering parameter $KPI_A$ "sending loudness rating" SLR, and the volume settings at both telecommunication terminal A, B represented by the engineering parameters $KPI_A$, $KPI_B$ receive loudness rating RLR are used as engineering parameters $KPI_{A/B}$ for identifying a quality parameter $KQI_{A, i=E, n}$. Furthermore the run time of the first telecommunication terminal A, the round trip delay is identified as engineering parameter $KPI_A$ and the current value of the network run time of the telecommunication network t is identified as operating parameter n. An echo run time is estimated from the run time of the first telecommunication terminal A and the network run time of the telecommunication network t. Based on the identified engineering parameters $KPI_{A/B}$ of the two telecommunication terminals A, B and the condition of the telecommunication network t, the quality parameter $KQI_{A, i=E, n}$, which is also identified as end to end quality parameter, $KQI_{E2E, A, i=E}$ is identified as a MOS value of 4.

The quality of the voice transmission perceived by the user $N_A$ of the first telecommunication terminal A with respect to the call aspect i "double talk" DT is also significantly influenced by the second telecommunication terminal B. In order to determine a quality parameter $KQI_{B, i=DT, n}$ the transmission sensitivity of the first telecommunication terminal A, represented by the engineering parameter $KPI_A$ "sending loudness rating" SLR, and the reproduction volumes of the two telecommunication terminals A, B provided by the engineering parameter $KPI_A$, $KPI_B$ "receive loudness rating" RLR are used. Furthermore the run time of the first telecommunication terminal A, the Roundtrip-Delay, is used as engineering parameter $KPI_A$ and the current value of the network run time of the telecommunication network t is used as an operating parameter n and the run time of the second telecommunication terminal B, the Roundtrip-Delay, is identified as engineering parameter $KPI_B$. When using the participating telecommunication terminals A, B and for a given condition of the telecommunication networks t the quality parameter $KQI_{B, i=DT, n}$, which is also identified as an end to end quality parameter $KQI_{E2E, A, i=DT}$ can be identified as MOS value of 5.

The preceding identification of the end to end quality parameter $KQI_{E2E, A, i=DT}$ is valid under the presumption that no interference, e.g. caused by the signal processing in the first telecommunication terminal A is added in the receiving direction of the first telecommunication terminal A, and that the telecommunication network does not cause any additional degradation of the double talk properties, e.g. by a attenuation control or by an echo compensation. In case the described degradations are present the influences can be considered by identifying additional quality parameters $KQI_{A, i=T, n}$ when determining the end to end quality parameters $KQI_{E2E, A, i=DT}$.

In order to assess the call aspect i "listening effort" LE for the user $N_A$ of the first telecommunication terminal A, the transmission sensitivity of the second telecommunication terminal B provided by the engineering parameter $KPI_B$ "sending loudness rating" SLR and the volume setting at the first telecommunication terminal A, provided by the engineering parameter $KQI_A$, "receive loudness rating" RLR are used to identify the suitable quality parameter $KPI_{A, i=LE, n}$. Furthermore the level of the background noise at the location of the first telecommunication terminal A, is determined in time periods without voice, however it is also conceivable to estimate the background noise level base on the typical application of the telecommunication terminal A. In the instant case the quality parameter $KQI_{A, i=LE, n}$ is identified as MOS value of 4. The MOS value also represents the end to end quality parameter $KQI_{E2E, A, LE}$.

Determining the total call quality $KQI_{E2E, G, A}$ is eventually performed by adding the end to end quality parameters $KQI_{E2E, A, i}$ of the four call aspects i. Presuming that the individual call aspects i influence the total call quality $KQI_{E2E, G, A}$ differently, the values of the individual end to end quality parameters $KQI_{E2E, A, i}$ are respectively weighted with a weighting factor $g_i$ before addition. The value of the weighting $g_i$ is a function of an identified value of the individual end to end quality parameter $KQI_{E2E, A, i}$, wherein the weighting factors $g_i$ with reference to the end to end quality parameter $KQI_{E2E, A, i}$ do not change in a linear manner in the illustrated embodiment. For the call aspects i "echo" E, "double talk" DT and "listening effort" LE the values of the respective end to end quality parameters are respectively weighted with a weighting factor of 0.25. Since the end to end quality parameter $KQI_{E2E, A, i=LQO}$ of the call aspect i "listening quality objective" (LQO) was only identified as MOS value of 3 the value of the corresponding weighting factor $g_i$ is 0.1. Thus, the value of the overall call quality $KQI_{E2E, G, A}$ can be determined as a MOS value of 3.55.

The total call quality $KQI_{EZE, G, B}$ for the user $N_B$ of the second telecommunication terminal B can be determined in the same way.

A non-transitory computer-readable storage medium storing instructions for implementing a method for determining a quality of voice transmitted by electrical signals between a first telecommunication terminal (A) and a second telecommunication terminal (B) in a telecommunication network (t), when executed by a processing device.

The data used in the embodiments of the present invention may be stored and/or recalled from a non-transitory computer-readable storage medium. For example, the identified value of the quality parameter ($KQI_{A/B, i, n}$) maybe stored in a multi-dimensional matrix residing in a non-transitory computer-readable storage medium. Other data may be similarly stored and/or recalled.

REFERENCE NUMERALS AND DESIGNATIONS

A first telecommunication terminal
B second telecommunication terminal
$N_A$ user of the first telecommunication terminal
$N_B$ user of the second telecommunication terminal
$R_A$ first router
$R_B$ second router
t telecommunication network
i call aspect
n operating parameter of telecommunication network
$KPI_{A/B}$ engineering parameter
$KQI_{A/B, i, n}$ quality parameter
$KQI_{E2E, A/B, i}$ end to end quality parameter
$KQI_{E2E, G, A/B}$ total call quality
LQO call aspect "listening quality objective"
E call aspect "Echo"
DT call aspect "double talk"
LE call aspect "listening effort"
SLR engineering parameter "sending loudness rating"
RLR engineering parameter "receive loudness rating"

What is claimed is:

1. A method for determining a quality of voice transmitted by electrical signals between a first telecommunication terminal and a second telecommunication terminal in a telecommunication network, the method comprising:
identifying a model type for the first telecommunication terminal and the second telecommunication terminal respectively;
identifying at least one operating parameter (n) for the telecommunication network;
selecting at least one call aspect (i) of the transmitted voice wherein a quality of the transmitted voice shall be determined for the at least one call aspect;
identifying a value of at least one quality parameter ($KQI_{A/B, i, n}$) for the at least one call aspect (i) for at least one of the first telecommunication terminal and the second telecommunication terminal as a function of a value of at least one selected engineering parameter ($KPI_{A/B}$) of the at least one telecommunication terminal as well as a function of the at least one operating parameter (n) of the telecommunication network;
determining a value of an end to end quality parameter ($KQI_{E2E, A, i}$) of the first telecommunication terminal for the at least one call aspect (i) as a function of the identified value of the at least one quality parameter ($KQI_{A/B, i, n}$), wherein the value of the end to end quality parameter ($KQI_{E2E, A, i}$) of the first telecommunication terminal represents a quality of the voice transmitted for the call aspect (i) as perceived by a first user ($N_A$) of the first telecommunication terminal; and
determining a value of an end to end quality parameter ($KQI_{E2E, A/B, i}$) for the first telecommunication terminal and the second telecommunication terminal (B),
wherein determining the end to end quality parameters ($KQI_{E2E, A/B, i}$) is performed by selecting an identified value of the quality parameter ($KQI_{A/B, i, n}$) so that the end to end quality parameter ($KQI_{E2E, A/B, i}$) corresponds to the quality parameter ($KQI_{A/B, i, n}$).

2. The method according to claim 1, wherein the call aspect (i) is selected from the group consisting of: echo; double talk (DT); and listening effort.

3. The method according to claim 2, wherein a respective value for the at least one quality parameter ($KQI_{A/B, i, n}$) is identified for at least one call aspect (i) for the first telecommunication terminal and the second telecommunication terminal.

4. The method according to claim 3, wherein determining the value of the end to end quality parameter ($KQI_{E2E, A/B, i}$) is performed by selecting a value of one of the quality parameters ($KQI_{A/B, i, n}$) of one of the first telecommunication terminal and the second telecommunication terminal that represents an inferior quality of the voice transmitted for the at least one call aspect (i) as perceived by the first user ($N_A$) of the first telecommunication terminal.

5. The method according to claim 4, wherein the call aspect (i) is listening quality objective.

6. The method according to claim 5, wherein identifying the value of the at least one quality parameter ($KQI_{A/B, i, n}$) is performed as a function of a respective value of a plurality of engineering parameters ($KPI_{A/B}$) wherein at least one engineering parameter ($KPI_{A/B}$) is associated with the first telecommunication terminal and the second telecommunication terminal respectively.

7. The method according to claim 6, wherein a value of an end to end quality parameter ($KQI_{E2E, A/B, i}$) is determined respectively for plural call aspects (i).

8. The method according to claim 7, further comprising:
determining a value of a total call quality ($KQI_{E2E, G, A/B}$) from the plurality of values for the end to end quality parameters ($KQI_{E2E, A/B, i}$) for one of the first telecommunication terminal and the second telecommunication terminal, wherein the determining is performed by weighted addition of individual values of the end to end quality parameters ($KQI_{E2E, A/B, i}$) for the different call aspects (i).

9. The method according to claim 8, wherein values of weighting factors ($g_{i=1 \ldots k}$), that are used to weight the values of different end to end quality parameters ($KQI_{E2E, A/B, i}$) before addition are different for different calls aspect (i).

10. The method according to claim 9,
wherein a value of at least one weighting factor ($g_i$) or of all weighting factors ($g_{i=1 \ldots k}$) is a function of the value of an associated end to end quality parameter ($KQI_{E2E, A/B, i}$), and
wherein a relationship between a respective value of the weighting factor ($g_i$) and the value of the associated end to end quality parameter ($KQI_{E2E, A/B, i}$) is non-linear.

11. A non-transitory computer-readable storage medium storing instructions for implementing the method of claim 1 when executed by a processing device.

12. A method for determining a quality of voice transmitted by electrical signals between a first telecommunication terminal and a second telecommunication terminal in a telecommunication network, the method comprising:
identifying a model type for the first telecommunication terminal and the second telecommunication terminal respectively;
identifying at least one operating parameter (n) for the telecommunication network;
selecting at least one call aspect (i) of the transmitted voice wherein a quality of the voice transmitted shall be determined for the at least one call aspect (i);
identifying a value of at least one quality parameter ($KQI_{A/B, i, n}$) for the at least one call aspect (i) for at least one of the first telecommunication terminal and the second telecommunication terminal as a function of a value of at least one selected engineering parameter ($KPI_{A/B}$) of the at least one telecommunication terminal as well as a function of the at least one operating parameter (n) of the telecommunication network;
determining a value of an end to end quality parameter ($KQI_{E2E, A, i}$) of the first telecommunication terminal for the at least one call aspect (i) as a function of the identified value of the at least one quality parameter ($KQI_{A/B, i, n}$), wherein the value of the end to end quality parameter ($KQI_{E2E, A, i}$) of the first telecommunication terminal represents a quality of the voice transmitted for the call aspect (i) as perceived by a user ($N_A$) of the first telecommunication terminal; further comprising determining a respective value of an end to end quality parameters ($KQI_{E2E, A/B, i}$) for the first and second telecommunication terminals; and
determining the end to end quality parameters ($KQI_{E2E, A/B, i}$) is performed by selecting the identified value of the quality parameter ($KQI_{A/B, i, n}$) so that the end to end quality parameter ($KQI_{E2E, A/B, i}$) corresponds to the quality parameter ($KQI_{A/B, i, n}$).

13. A method for determining a quality of voice transmitted by electrical signals between a first telecommunication terminal and a second telecommunication terminal in a telecommunication network, the method comprising:
identifying a model type for the first telecommunication terminal and the second telecommunication terminal respectively;
identifying at least one operating parameter (n) for the telecommunication network;
selecting at least one call aspect (i) of the transmitted voice wherein a quality of the voice transmitted shall be determined for the at least one call aspect (i);
identifying a value of at least one quality parameter ($KQI_{A/B, i, n}$) for the at least one call aspect (i) for at least one of the first telecommunication terminal and the second telecommunication terminal as a function of a value of at least one selected engineering parameter ($KPI_{A/B}$) of the at least one telecommunication terminal as well as a function of the at least one operating parameter (n) of the telecommunication network;
determining a value of an end to end quality parameter ($KQI_{E2E, A, i}$) of the first telecommunication terminal for the at least one call aspect (i) as a function of the identified value of the at least one quality parameter ($KQI_{A/B, i, n}$), wherein the value of the end to end quality parameter ($KQI_{E2E, A, i}$) of the first telecommunication terminal represents a quality of the voice transmitted for the call aspect (i) as perceived by a user ($N_A$) of the first telecommunication terminal; further comprising determining a respective value of an end to end quality parameters ($KQI_{E2E, A/B, i}$) for the first and second telecommunication terminals; and
determining the end to end quality parameters ($KQI_{E2E, A/B, i}$) is performed by selecting the identified value of the quality parameter ($KQI_{A/B, i, n}$) so that the end to end quality parameter ($KQI_{E2E, A/B, i}$) corresponds to the quality parameter ($KQI_{A/B, i, n}$),
wherein the identified value of the quality parameter ($KQI_{A/B, i, n}$) is stored in a a multi-dimensional matrix residing in a non-transitory computer-readable storage medium.

14. The method according to claim 13, further comprising:
determining a respective value of an end to end quality parameters ($KQI_{E2E, A/B, i}$) for the first and second telecommunication terminals,
wherein determining the end to end quality parameters ($KQI_{E2E, A/B, i}$) is performed by selecting the identified value of the quality parameter ($KQI_{A/B, i, n}$) so that the end to end quality parameter ($KQI_{E2E, A/B, i}$) corresponds to the quality parameter ($KQI_{A/B, i, n}$).

15. The method according to claim 13, wherein determining the value of the end to end quality parameter ($KQI_{E2E, A/B, i}$) is performed by selecting the value of one of the quality parameters ($KQI_{A/B, i, n}$) of one of the first and second telecommunication terminals that represents an inferior quality of the voice transmission for the respective call aspect (i) as perceived by the user ($N_A$) of the first telecommunication terminal.

16. The method according to claim 13, wherein identifying the value of the at least one quality parameters ($KQI_{A/B, i, n}$) is performed as a function of a respective value of a plurality of engineering parameters ($KPI_{A/B}$) wherein at least one engineering parameter ($KPI_{A/B}$) is respectively associated with each respective telecommunication terminal of the first and second telecommunication terminals.

17. The method according to claim 13, wherein a value of an end to end quality parameters ($KQI_{E2E, A/B, i}$) is determined respectively for plural call aspects (i).

18. The method according to claim 17, further comprising determining a value of a total call quality ($KQI_{E2E, G, A/B}$) from the plurality of values for the end to end quality parameters ($KQI_{E2E, A/B, i}$) for one of the first and second telecommunication terminals, wherein the determining is performed by weighted addition of the individual values of the end to end quality parameters ($KQI_{E2E, A/B, i}$) for the different call aspects (i).

* * * * *